US012609455B2

(12) United States Patent
Legay et al.

(10) Patent No.: US 12,609,455 B2
(45) Date of Patent: Apr. 21, 2026

(54) DEVICE FOR CONTROLLING RF ELECTROMAGNETIC BEAMS ACCORDING TO THEIR ANGLE OF INCIDENCE, AND MANUFACTURING METHOD

(71) Applicants: THALES, Meudon (FR); UNIVERSITE DE RENNES, Rennes (FR); CENTRE NATIONAL DE LA RECHERCHE SCIENTIFIQUE, Paris (FR); INSA DE RENNES, Rennes (FR); NANTES UNIVERSITE, Nantes (FR); CENTRALESUPELEC, Gif-sur-Yvette (FR)

(72) Inventors: Hervé Legay, Plaisance du Touch (FR); Charalampos Stoumpos, Toulouse (FR); Jean-Philippe Fraysse, Toulouse (FR)

(73) Assignees: THALES, Meudon (FR); UNIVERSITE DE RENNES, Rennes (FR); CENTRE NATIONAL DE LA RECHERCHE SCIENTIFIQUE, Paris (FR); INSA DE RENNES, Rennes (FR); NANTES UNIVERSITE, Nantes (FR); CENTRALSUPELEC, Gil-sur-Yvette (FR)

( * ) Notice: Subject to any disclaimer, the term of this patent is extended or adjusted under 35 U.S.C. 154(b) by 118 days.

(21) Appl. No.: 18/510,489

(22) Filed: Nov. 15, 2023

(65) Prior Publication Data

US 2024/0170852 A1 May 23, 2024

(30) Foreign Application Priority Data

Nov. 18, 2022 (FR) ...................................... 2211991

(51) Int. Cl.
*H01Q 13/08* (2006.01)
*H01Q 1/52* (2006.01)
(Continued)

(52) U.S. Cl.
CPC ........... *H01Q 13/085* (2013.01); *H01Q 1/523* (2013.01); *H01Q 13/0275* (2013.01); *H01Q 21/064* (2013.01); *H01Q 1/288* (2013.01)

(58) Field of Classification Search
CPC .......... H01Q 1/288; H01Q 1/425; H01Q 1/48; H01Q 1/52; H01Q 1/521; H01Q 1/523;
(Continued)

(56) References Cited

U.S. PATENT DOCUMENTS

2019/0058260 A1* 2/2019 Kirino .................. H01Q 21/064
2020/0091621 A1 3/2020 Huang et al.
(Continued)

FOREIGN PATENT DOCUMENTS

FR 2 986 377 A1 8/2013
FR 3 117 685 A1 6/2022
WO 2007/076963 A1 7/2007

OTHER PUBLICATIONS

Carter, "Mutual impedance effects in large beam scanning arrays", IRE Transactions on Antennas and Propagation, vol. 8, No. 3, pp. 276-285, 1960.
(Continued)

*Primary Examiner* — Robert Karacsony
(74) *Attorney, Agent, or Firm* — BakerHostetler

(57) ABSTRACT

A device for controlling radiofrequency beams comprising a set of cells. Each cell comprises a support frame and an excitation element, and emits and/or receives beams in an invariant manner according to the direction of propagation of the beam. The frame is inscribed within a generally tubular shape, oriented along the axis Z of a reference frame,
(Continued)

having a cross section of perimeter P, and comprises an entrance, an exit and a number N of slots between the exit and a position Zo located between the entrance and the exit. Each slot has a variable width along Z. The slot width has a minimum value at the position Zo, and a maximum value at the exit that is determined on the basis of the perimeter P and the number N.

20 Claims, 8 Drawing Sheets

(51) Int. Cl.
*H01Q 13/02* (2006.01)
*H01Q 21/06* (2006.01)
*H01Q 1/28* (2006.01)

(58) Field of Classification Search
CPC .. H01Q 5/40; H01Q 5/42; H01Q 5/45; H01Q 5/49; H01Q 9/0404; H01Q 9/0414; H01Q 9/0478; H01Q 13/0266; H01Q 13/0275; H01Q 13/085; H01Q 21/061; H01Q 21/064; H01Q 21/065; H01Q 21/067
See application file for complete search history.

(56) References Cited

U.S. PATENT DOCUMENTS

2020/0112077 A1* 4/2020 Kamo ..................... G01S 7/032
2022/0077598 A1 3/2022 Da Silveira et al.
2024/0305015 A1* 9/2024 Formaggi .......... H01Q 13/0275

OTHER PUBLICATIONS

Holland, et al., "The Planar Ultrawideband Modular Antenna (PUMA) Array", IEEE Tap, vol. 60, No. 1, pp. 130-140, 2012.
Sajuyigbe et al., "Wide angle impedance matching metamaterials for waveguide-fed phased-array antennas", IET Microwaves, Antennas & Propagation, vol. 4, No. 8, pp. 1063-1072, 2010.
Magill et al., "Wide-angle impedance matching of a planar array antenna by a dielectric sheet", IEEE Transactions on Antennas and Propagation, vol. 14, No. 1, pp. 49-53, 1966.

* cited by examiner

DEVICE FOR CONTROLLING RF ELECTROMAGNETIC BEAMS ACCORDING TO THEIR ANGLE OF INCIDENCE, AND MANUFACTURING METHOD

CROSS-REFERENCE TO RELATED APPLICATION

This application claims priority to foreign French patent application No. FR 2211991, filed on Nov. 18, 2022, the disclosure of which is incorporated by reference in its entirety.

FIELD OF THE INVENTION

The present invention relates in general to the radiofrequency (RF) domain, and in particular to a device for controlling RF electromagnetic beams, notably for controlling the emission and/or the reception of electromagnetic beams according to a beam angle of incidence with respect to the device, and to a method for manufacturing such a device.

BACKGROUND

It is known to use devices for controlling beams coming from sources of RF electromagnetic signals, these devices consisting of an array of small radiating elements in which an RF electromagnetic wave circulates, as described for example in patent application FR3117685A1. Such devices, which are generally planar, are configured to emit and/or receive electromagnetic beams characterized by a direction forming a beam angle of incidence with respect to the planar device. Each radiating element (and thus the induced device) may be characterized by an active impedance.

In such devices, there is significant mutual coupling between adjacent RF electromagnetic waves of one and the same array. The mutual coupling between radiating elements contributes, depending on the angle of incidence of a beam with respect to the device, to modifying the active impedance of the radiating elements and thus significantly limits the RF beam transmission performance of a device over a low-elevation angular sector and/or over certain specific directions, called "blinding directions", as described for example in the article "Mutual impedance effects in large beam scanning arrays" by P. Carter et al., IRE Transactions on Antennas and Propagation, vol. 8, no. 3, 1960, pages 276-285.

Some known solutions, referred to as matching solutions, are used to stabilize the active impedance of a control device according to the beam direction of propagation. These matching solutions comprise for example the implementation of WAIM screens (WAIM standing for Wide Angle Impedance Matching), as described for example in the article "Wide-angle impedance matching of a planar array antenna by a dielectric sheet" by E. Magill et al., IEEE Transactions on Antennas and Propagation, vol. 14, no. 1, 1966, pages 49-53, or in the article "Wide angle impedance matching metamaterials for waveguide-fed phased-array antennas" by S. Sajuyigbe et al., IET Microwaves, Antennas & Propagation, vol. 4, no. 8, 2010, pages 1063-1072. Other known matching solutions comprise the use of dipoles that are strongly coupled to one another by interdigitated capacitors, as described in the article "The Planar Ultrawideband Modular Antenna (PUMA) Array" by S. S. Holland et al., IEEE TAP, vol. 60, no. 1, 2012, pages 130-140. However, the design of these matching solutions is complex, and manufacturing them entails numerous constraints, such as the implementation of technologies based on dielectric substrates that are liable to create ohmic losses in the compatible bandwidth frequencies of the telecommunications system.

There is thus a need for an improved device for controlling beams of RF electromagnetic waves over a wide beam aim-off angular sector with respect to the device and for reducing blinding directions, via a solution for improving the stability of the active impedance of the device.

SUMMARY OF THE INVENTION

The present invention aims to improve the situation by proposing a device for controlling radiofrequency beams that is defined in an orthogonal reference frame (X,Y,Z). The device generally extends in the plane (X,Y) of the orthogonal reference frame (X,Y,Z). The device comprises a set of at least one cell corresponding to a radiating element. The cell comprises a support frame and an excitation element for exciting the radiating element, each radiofrequency beam being defined according to a given direction of propagation having an angle of incidence θ with respect to the device. The support frame is inscribed within a generally tubular shape oriented along the axis Z of the orthogonal reference frame (X,Y,Z). The tubular shape has a given length $d_z$ along the axis of the frame Z and a cross section defined in the plane (X,Y). The cross section has a perimeter P, and the support frame comprises a frame entrance and a frame exit. The support frame furthermore comprises a number N of slots extending, along the axis of the frame Z, between the frame exit and a slot position $Z_{0n}$ along the axis of the frame Z. The slot position $Z_{0n}$ is located between the frame entrance and the frame exit, and each slot has a variable slot width $w_n$ along the axis of the frame Z. The slot width $w_n$ has a minimum slot value $$w_n^{min}$$

at the slot position $Z_{0n}$, and a maximum slot value $$w_n^{max}$$

at the frame exit, the maximum slot value $$w_n^{max}$$

being determined on the basis of the perimeter P of the cross section and the number N of slots. Each cell is configured to emit and/or receive radiofrequency beams in an invariant manner according to the direction of propagation.

Each slot may be associated with at least two slot edges, the slot edges representing the limits of the support frame connecting the slot position $Z_{0n}$ to the frame exit. Each slot edge may be associated with a variability function, the variability function being a concave and/or convex polygonal function.

In some embodiments, the excitation element may comprise a number H of longitudinal metal ridges arranged inside the tubular shape. A ridge may extend along the axis of the frame Z between the frame entrance and a rib position $Z_h$. The ridge position $Z_h$ may be defined between the frame entrance and the frame exit.

In particular, the number H of ridges may be equal to the number N of slots.

The ridges of the cell may be identical to one another and the slots of the cell may be identical to one another. The ridges position $Z_h$ may be defined between the slot position $Z_{0n}$ and the frame exit.

In some embodiments, the excitation element may comprise what is referred to as a "Vivaldi" antipodal transition arranged at least partially inside the tubular shape. The transition may comprise at least a first metal etching and a second metal etching extending along the axis of the frame Z between the frame entrance and an etching position $Z_{0g}$. The etching position $Z_{0g}$ may be defined between the frame entrance and the frame exit.

In some embodiments, the excitation element may comprise a number T of planar metal elements arranged inside the tubular shape, a planar element extending in the plane (X,Y) at a planar position $Z_t$. The planar position $Z_t$ may be defined between the frame entrance and the frame exit.

The slots of the cell may be identical to one another, the planar position $Z_t$ being defined between the slot position $Z_{0n}$ and the frame exit.

The device may be partly metallic. The cross section may have a circular or polygonal shape.

The invention also provides a method for manufacturing the device for controlling radiofrequency beams, characterized in that the device is at least partially metallic, and the manufacturing method uses at least one 3D printing technique.

The device according to the embodiments of the invention makes it possible to control beams of RF electromagnetic waves over a wide beam aim-off angular sector with respect to the device and to reduce blinding directions, by virtue of improving the stability of the active impedance of the device.

Such a device is particularly suitable for RF bandwidths compatible with antenna-based telecommunications systems. It also provides an efficient solution while at the same time limiting complexity and manufacturing costs, and makes it possible to obtain a reduced weight and significant compactness. In particular, in the space sector, such a device does not impact the payload of the satellite.

BRIEF DESCRIPTION OF THE DRAWINGS

Other features, details and advantages of the invention will become apparent on reading the description given with reference to the appended drawings, which are given by way of example.

Identical references are used in the figures to denote identical or similar elements. For the sake of clarity, the elements that are shown are not to scale.

DETAILED DESCRIPTION

Figure 1:
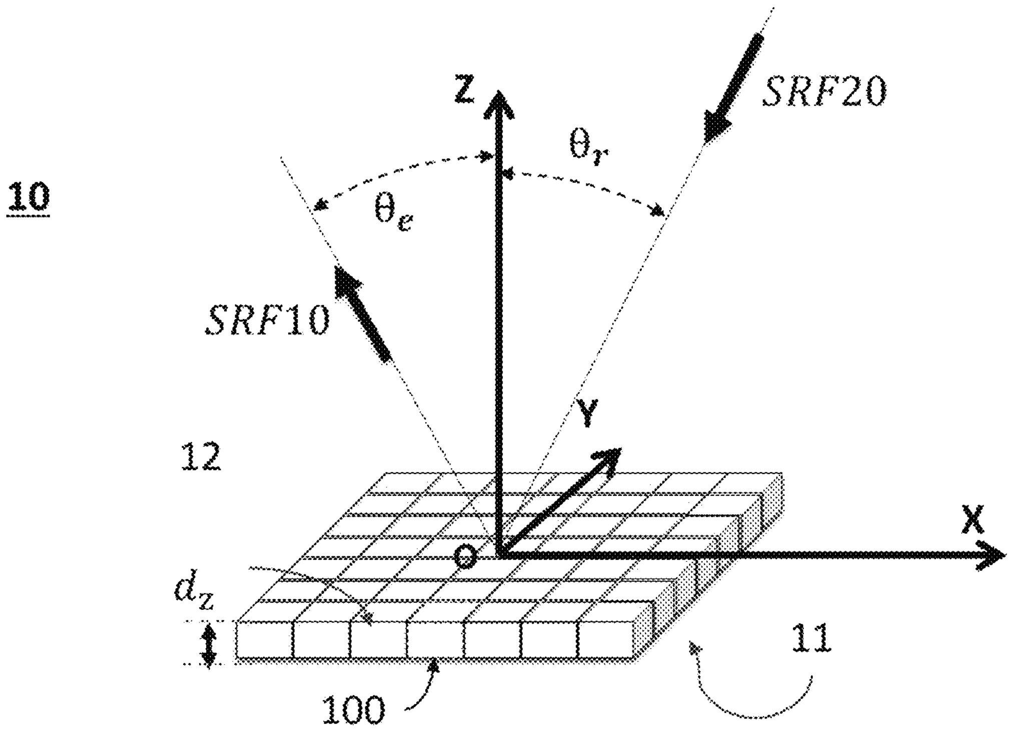
FIG. 1 is a diagram showing a device for controlling radiofrequency beams, according to some embodiments of the invention.

FIG. 1 schematically shows a device 10 for controlling radiofrequency (RF) beams according to some embodiments of the invention.

The device 10 for controlling RF beams (hereinafter also called 'device 10') may be used in an antenna system 1. For example and without limitation, an antenna system may be implemented in the form of an active antenna installed on board a low-Earth orbit (or LEO) satellite and belonging to a constellation of satellites intended to provide telecommunications services all over the Earth.

An antenna system 1 may thus be configured to emit and/or receive beams (or signals) of RF electromagnetic waves. A beam of RF electromagnetic waves is associated with an RF frequency band (being inversely proportional to a wavelength 1). For example, an antenna system 1 may be configured to emit an RF signal in specific frequency bands. Such a specific frequency band may correspond to a low-frequency band, such as for example an "L band" or an "S band" of typically between 1 and 2 GHz or 2 and 4 GHz. Such a specific frequency band may also correspond to a higher-frequency band (used for high-throughput telecommunications systems for example), such as for example a "Ku band", a "Ka band" or a "Q/V band" of typically between 12 and 18 GHz or 22.5 and 40 GHz. An electromagnetic wave of an RF signal may furthermore be characterized by a given phase, a given amplitude and a given polarization. The RF beams emitted by the antenna system 1 are designated by the notation SRF10 in FIGS. 1 and 2, and the RF beams received by the antenna system 1 are designated by the notation SRF20 in FIGS. 1 and 2.

The device 10 for controlling radiofrequency beams may be configured to emit the beams SRF10. In addition, the device 10 for controlling radiofrequency beams may also be configured to receive external beams SRF20. Thus, as used here, the term "controlling radiofrequency beams" (also called 'manipulating radiofrequency beams') refers to various phenomena related to electromagnetic waves that may occur when an RF beam interacts with the material of a given object (here the device 10). These phenomena may comprise notably emission, reception, transmission, reflection, absorption, diffusion, refraction and/or diffraction of the electromagnetic wave.

As shown in FIG. 1, the device 10 for controlling RF beams is defined in a reference frame (X,Y,Z). In particular, the device 10 comprises a first face 11 (also called 'entrance face') and a second face 12 (also called 'exit face') opposite the first face 11. The beam SRF10 is emitted from the second face 12 of the device 10, while the beam SRF20 is received by the second face 12. The terms "entrance" or "exit" are used here depending on the direction of circulation of the radiofrequency waves (RF) in the device 10 when this is operating in emission mode, that is to say in the direction of circulation from the first face 11 to the second face 12.

The two faces 11 and 12 are spaced from one another by a distance $d_z$ representing the thickness of the device 10. The thickness value of the device $d_z$ is very small compared to the overall size of the antenna system, and the device 10 may have a generally flat structure, defined in the plane (X,Y) orthogonal to the axis Z. The device 10 thus extends generally in the plane (X,Y).

In one embodiment, the two faces 11 and 12 of the device 10 may be parallel to one another. In such an embodiment, the two faces 11 and 12 may be surfaces defined in two dimensions in the plane (X,Y) orthogonal to the normal axis Z. As a variant, the two faces 11 and 12 may be surfaces defined in three dimensions in the reference frame (X,Y,Z). In these embodiments, the thickness of the device $d_z$ between the two parallel faces 11 and 12 is homogeneous along the device 10.

As an alternative, the thickness of the device $d_z$ between the two faces 11 and 12 is inhomogeneous along the device 10, the thickness of the device $d_z$ varying along the axis X and/or along the axis Y. In this embodiment with variable thickness of the device, at least one of the two faces 11 and 12 may be defined as a surface defined in three dimensions in the reference frame (X,Y,Z). For example and without limitation, the device 10 may comprise a centre O positioned in the plane (X,Y), the thickness of the device $d_z$ varying in an increasing or decreasing manner from this centre O, along the axis X, so as to form a quasi-optical element, possibly being a concave or convex element.

The device 10 for controlling RF beams according to the embodiments of the invention comprises a set of cells 100 arranged in the plane (X,Y), as shown in FIG. 1.

A beam SRF10 emitted by the device 10 may be characterized by a given emission direction of incidence. As shown in FIG. 1, the emission direction of incidence of a beam SRF10 forms, with the normal axis Z of the device 10, an emission angle of incidence denoted $\theta_e$.

A beam SRF20 received by the device 10 may be characterized by a given reception direction of incidence. As shown in FIG. 1, the reception direction of incidence of a beam SRF20 forms, with the normal axis Z of the device 10, a reception angle of incidence denoted $\theta_r$.

The beams SRF10 emitted and/or the beams SRF20 received by the device 10 may also be characterized by a maximum angular sector $\theta_{max}$, the emission angles of incidence $\theta_e$ and reception angles of incidence $\theta_r$ then being between 0 and $\theta_{max}$. The emitted beams SRF10 and/or received beams SRF20 are then said to be 'aimed off'. For example and without limitation, the maximum angular sector, denoted $\theta_{max}$, may be equal to ±55°. The emitted beams SRF10 and/or received beams SRF20 may also be associated with an angular vision sector denoted $\theta_1$ and corresponding to an angular sector in which the beam transmission should take place, that is to say an angular sector without "blinding".

Figure 2:
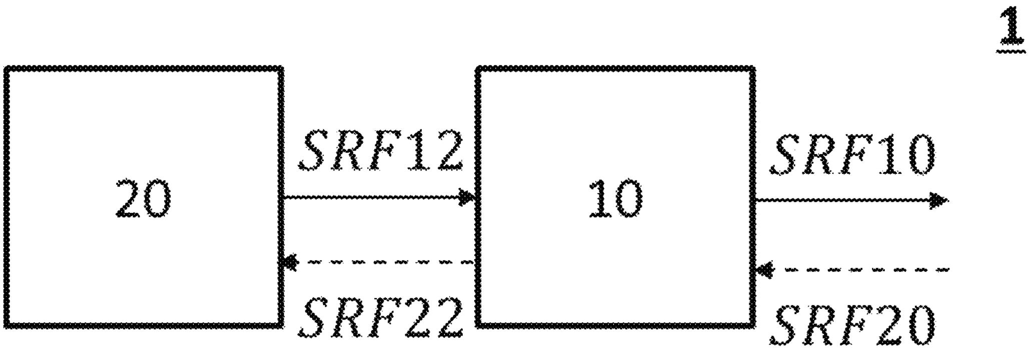
FIG. 2 is a diagram showing an antenna system, according to some embodiments of the invention.

In the exemplary embodiment shown schematically in FIG. 2, the antenna system 1 comprises the device 10 for controlling RF beams and a beamforming unit 20.

The beamforming unit 20 (also referred to more simply as 'unit 20' in the remainder of the description) may be a multi-beamformer as described for example in patent application FR2986377A1.

The beamforming unit 20 may be configured to generate and transmit one or more electromagnetic wave signals, designated by the notation SRF12 in FIG. 2, to the device 10. Advantageously, the beamforming unit 20 may be configured to transmit a distinct signal SRF12 to each cell 100 of the device 10.

In some embodiments of the invention, the unit 20 may be configured to apply a phase modification and/or amplitude modification to these signals SRF12, so as to aim off the emitted beams SRF10 at emission angles of incidence $\theta_e$ that are distinct and/or variable between 0 and $\theta_{max}$.

In these embodiments, the unit 20 may therefore be configured to receive one or more RF signals SRF22 resulting from the transmission of the external beam SRF20 received by the device 10. The unit 20 may thus be configured to receive a distinct signal SRF22 to be processed from each cell 100. The unit 20 may be configured to apply a phase measurement and/or amplitude measurement to these signals SRF22 so as to estimate the reception direction of incidence of the received beam SRF20. The unit 20 may also be configured to apply a weighted combination of the RF signals SRF22 based on the estimated direction. Advantageously, the antenna system 1 may comprise a processing unit (for example a processor of the payload of the satellite, not shown in the figures) configured to process the signals SRF22 received and processed by the unit 20.

Each cell 100 of the device 10 corresponds to a radiating element and comprises an external cell support frame 130 and an internal cell excitation element 150. The device 10 is thus referred to as a 'radiating panel'.

Figure 3:
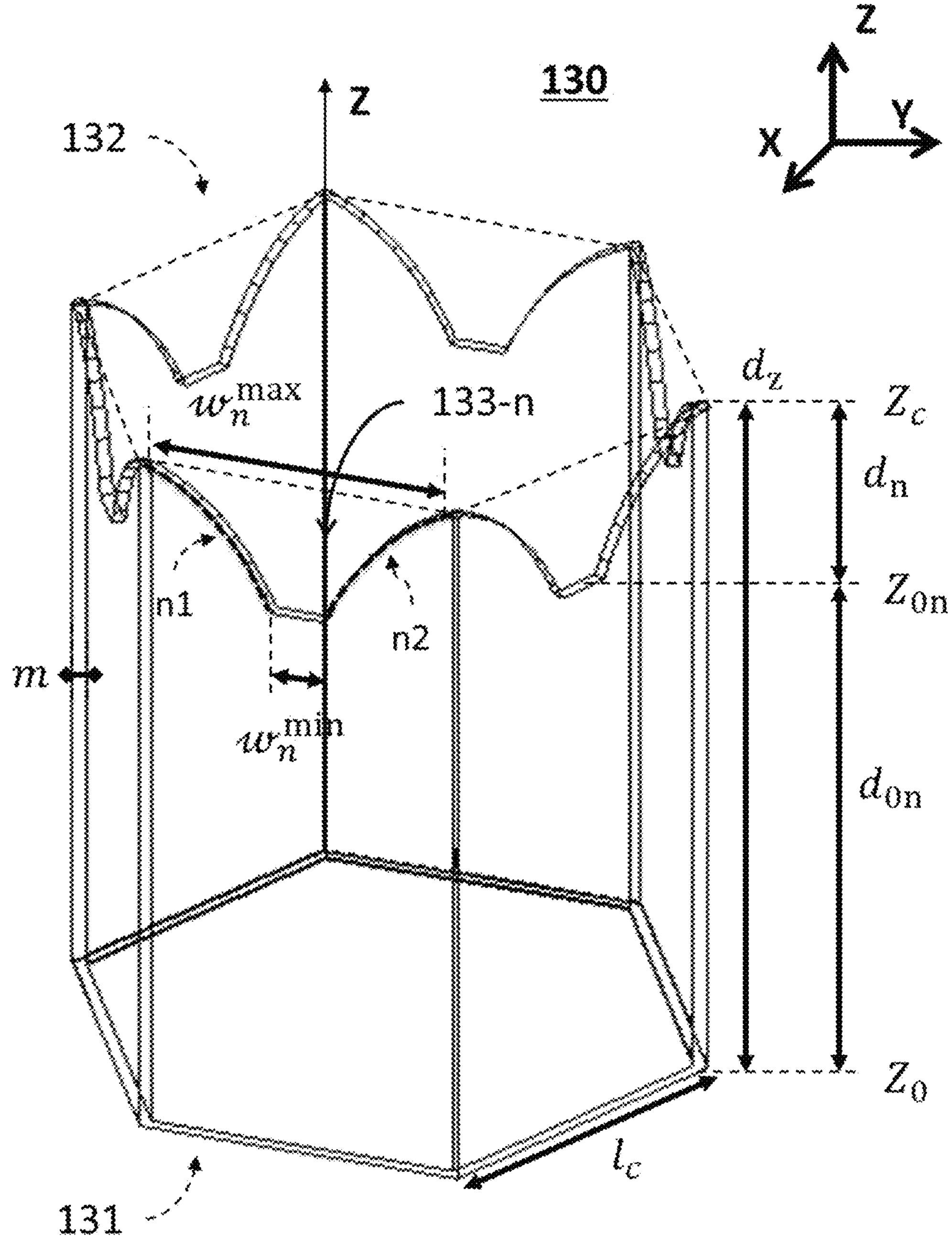
FIG. 3 is a diagram showing the support frame of a cell of the device for controlling radiofrequency beams, according to some modes of the invention.
Figure 4:
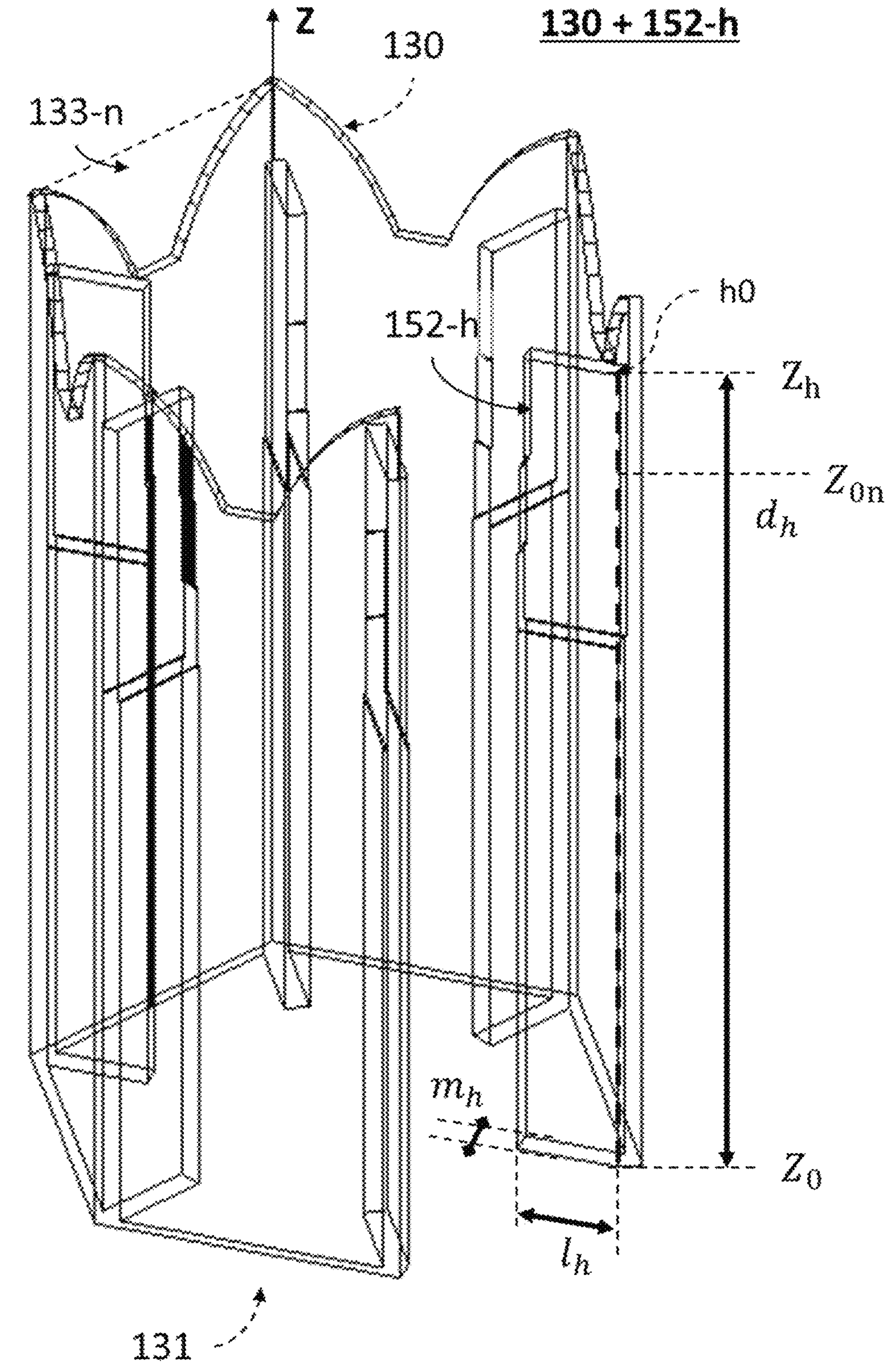
FIG. 4 is a perspective view of a cell of the device for controlling radiofrequency beams, showing the support frame and internal ridges of the cell, according to some modes of the invention.
Figure 5:
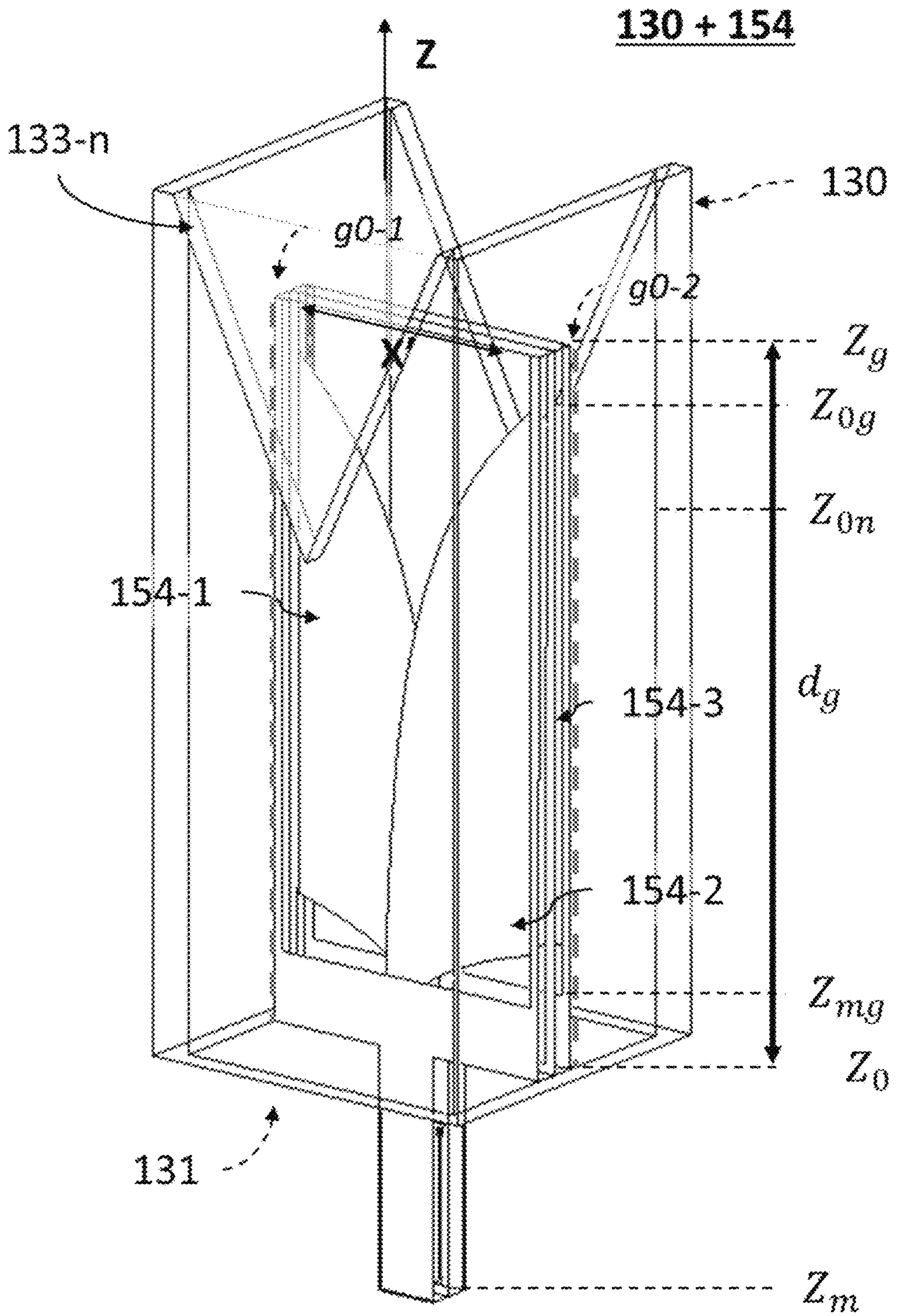
FIG. 5 is a perspective view of a cell of the device for controlling radiofrequency beams, showing the support frame and an internal antipodal transition of the cell, according to some modes of the invention.
Figure 6:
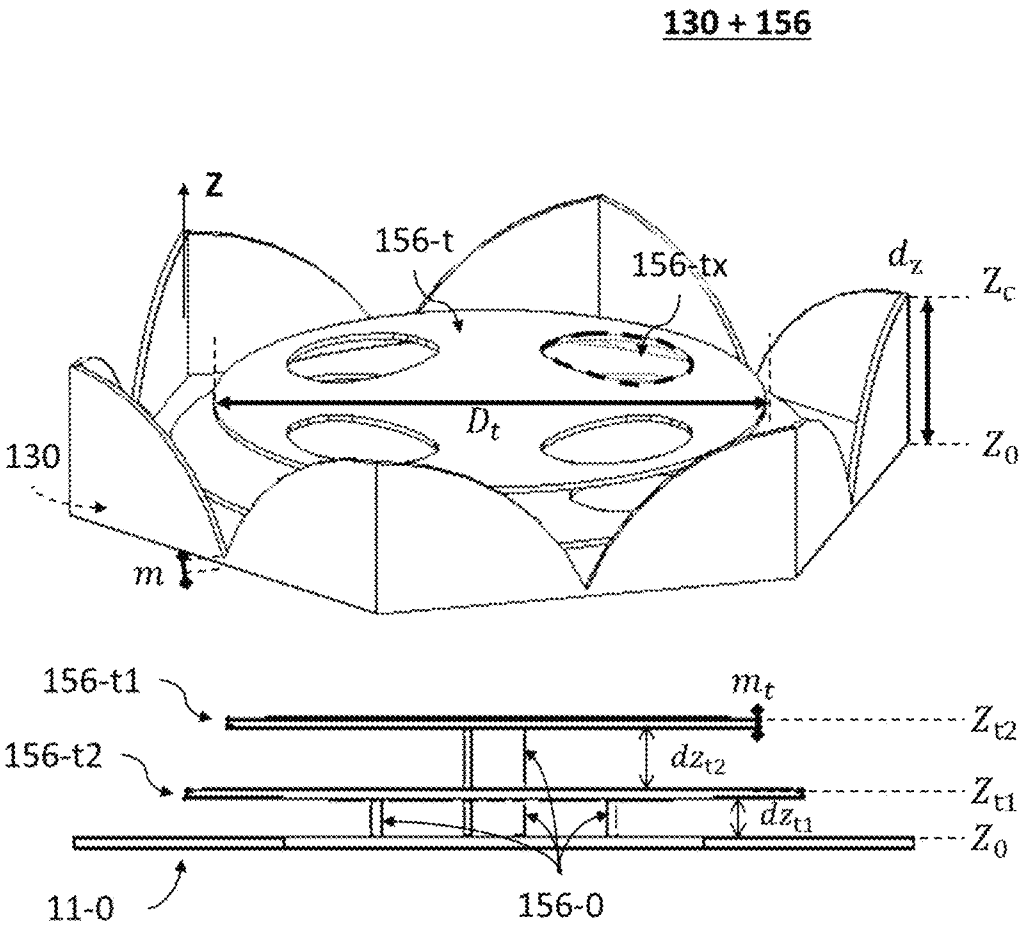
FIG. 6 is a perspective view of a cell of the device for controlling radiofrequency beams, showing the support frame and internal planar elements of the cell, according to some modes of the invention.

FIG. 3 shows only the support frame 130, so as to facilitate understanding of the invention. FIGS. 4, 5 and 6 illustrate perspective views of a cell 100 comprising a support frame 130, according to various embodiments.

The support frame 130 of a cell 100 is inscribed within a generally tubular shape having a main axis extending along the axis Z, also called "axis of the frame".

As shown in FIG. 3, the support frame 130 of a cell 100 (also called a waveguide) comprises a frame entrance 131 arranged in the plane (X,Y), at the entrance face 11. The position $Z_0$ of the frame entrance 131 along the axis Z is called "entrance position". The support frame 130 of a cell 100 furthermore comprises a frame exit 132, aligned in the plane (X,Y) at the exit face 12. The position $Z_c$ of the frame exit 132 along the axis Z is called "exit position".

The support frame 130 consists of a set of "walls" having a wall thickness m. The support frame 130 has a frame length defined along the axis of the frame Z. The length of the support frame may be substantially equal to the thickness of the device $d_z$, such that $d_z = Z_c - Z_0$. For example and without limitation, the thickness of the device $d_z$ may be less than or equal to a value substantially equal to λ/2. In the embodiments in which the thickness of the device $d_z$ is variable in the plane (X,Y), each cell 100 may be associated with a specific cell length $d_{z(n)}$.

The tubular shape of the support frame 130 comprises a cross section defined in a plane (X,Y) perpendicular to the axis Z. The cross section is characterized by a given shape and a perimeter value P that is calculated based on the dimensions of the shape of the cross section. For example and without limitation, the cross section may be of circular, oval, square, rectangular or polygonal shape.

In some embodiments in which the cross section is a polygon comprising a number $N_c$ of sides, the tubular shape may correspond to a polyhedron with $N_c$ facets each having a parallelogram shape. Each facet (or "prismatic face" corresponding to the walls) extends along the axis of the frame Z. Such a polyhedron may be for example an even-order regular polygon, and in particular a square parallelepipedal polygon (where $N_c$=4), called a cuboid, or a hexagonal prism (where $N_c=6$), as shown in FIG. 3. In such an embodiment, the $N_c$ facets are connected to one another by $N_c$ edges oriented along the axis of the frame Z.

The support frame 130 of a cell 100 also comprises a number N of slots (or notches) denoted 133-*n*, "n" being an index associated with the various slots, with n ε [1, N]. Each slot 133-*n* extends along the axis of the frame Z, from the position $Z_c$ of the frame exit 132 to a slot position (or initial slot position) denoted $Z_{0n}$. As shown in FIG. 3, the slot position $Z_{0n}$ is arranged between the frame entrance 131 (that is to say entrance position $Z_0$) and the frame exit 132 (that is to say exit position $Z_c$). Each slot 133-*n* thus has a slot length $d_n$ defined along the axis of the frame Z, such that $d_n=Z_c-Z_{0n}$ and $d_n<d_z$ (or $d_n<d_{z(n)}$). Each slot 133-*n* is furthermore associated with at least two slot edges, respectively denoted n1 and n2, representing the limits of the support frame 130 and connecting the slot position $Z_{0n}$ to the exit position $Z_c$, as indicated in FIG. 3. Each slot edge, n1 or n2, may be characterized by what is known as a predefined variability function, respectively denoted $f_{n1}$ or $f_{n2}$. As a result, each slot 133-*n* has a variable slot width $w_n$, along the axis of the frame Z, constructed from the variability functions $f_{n1}$ and $f_{n2}$.

In particular, the slots may be flared in the direction of the exit position 132. The variable slot width $w_n$ thus assumes a maximum slot value $$w_n^{max}$$

at the support frame exit 132 and a minimum slot value $$w_n^{min}$$

at the position $Z_{0n}$. The maximum slot value $$w_n^{max}$$

may be determined on the basis of the perimeter P of the cross section of the cell 100 and of the number N of slots 133-*n*. The minimum slot value $$w_n^{min}$$

is less than the maximum slot value $$w_n^{max},$$

that is to say:

$$w_n^{max} > w_n^{min} \tag{01}$$

For example and without limitation, a slot variability function $f_n$ may be a linear function (cf. FIG. 5), a stepped function or any other function (monotonic or non-monotonic, what is referred to as an increasing concave and/or convex polygonal function as illustrated in FIGS. 3, 4 and 6 for example) so as to vary the width $w_n$ of the slot 133-*n* along the axis of the frame Z from a minimum value $$w_n^{min}$$

to a maximum value $$w_n^{max}.$$

Advantageously, a slot variability function $f_n$ may be defined by an exponential function so as to vary the width $w_n$ exponentially between the minimum value $$w_n^{min}$$

and the maximum value $$w_n^{max}.$$

In some embodiments, the slot edges n1 and n2 of a slot 133-*n* may be symmetrical to one another about an axis Z defined at the centre of this slot 133-*n*. In particular, in the embodiments in which the slot 133-*n* is positioned on a facet of the support frame 130, the slot edges n1 and n2 may be symmetrical about an axis Z defined at the centre of this facet.

The dimensions of the slots (that is to say the widths $w_n$ and variabilities $f_n$, and/or the slot lengths $d_n$ for example) of one and the same cell 100 and/or of the slots of the set of cells 100 of the device 10 for controlling RF beams may be identical or different from one another depending on the applications of the invention. For example, and without limitation, a device 10 for controlling RF beams may comprise profile modulations of slots 133-*n* (of a few micrometres for example) with respect to the centre O of the device 10 in order to spatially modulate the phase of the incident beam, so as to deal with certain edge effects. The device 10 for controlling RF beams, generally extending in a plane (X,Y), may thus comprise a set of multiple cells 100 having geometric shapes and support frame and slot dimensions that are variable in the plane (X,Y) and chosen so as to modify the phase and the associated wavefront of the electromagnetic wave in the plane (X,Y) very finely (at the cell level).

In the embodiments in which the slot lengths $d_n$ of the slots of one and the same cell 100 are identical, the support frame 130 of this cell 100 may be broken down into two parts, shown in FIG. 3, comprising:

- a first part of length $d_{0n}$ (or $d_0$) corresponding to a slot-free support frame 130, and
- a second part of length $d_n$ (or d) corresponding to a slotted support frame 130.

According to some embodiments, the length of the first part $d_{0n}$ of a slot 133-*n* (such that $d_{0n}=Z_{0n}-Z_c$) may be equal to the wall thickness m. For example, the first, slot-free part may be negligible compared to the second, slotted part if all of the slots of one and the same cell 100 are characterized by one and the same length $d_{0n}$ of the first part, which is then equal to the wall thickness m, such that $Z_{0n} \cong Z_0$, as shown in FIG. 6.

The minimum value $$w_n^{min}$$

of the width of a slot 133-*n* may be equal to 0, that is to say $$w_n^{min} = 0$$

and $$w_n^{min} \lesssim m,$$

as shown in FIGS. 5 and 6. As an alternative, the minimum slot value $$w_n^{min}$$

may be greater than or equal to the wall thickness m, as shown in FIGS. 3 and 4. Such a minimum slot value $$w_n^{min}$$

other than zero makes it possible to obtain a compact cell 100 design along the axis Z.

The maximum value $$w_n^{max}$$

of the width of a slot 133-*n* is greater than the wall thickness m. In particular, the maximum slot value $$w_n^{max}$$

may be defined on the basis of the ratio between the perimeter P of the cross section, the number N of slots 133-*n*, and a proportion coefficient denoted $\varepsilon_n$, as defined by the following expression (02):

$$w_n^{max} = \varepsilon_n \times \frac{P}{N} \tag{02}$$

In particular, the sum of the proportion coefficients $\varepsilon_n$ over all of the slots 133-*n* is less than or equal to N, according to the following expression (03):

$$\Sigma_n \varepsilon_n \leq N \tag{03}$$

In some embodiments, the maximum width values $$w_n^{max}$$

of the slots of one and the same cell 100 may be identical.

In particular, the proportion coefficients $\varepsilon_n$ may be equal for the N slots 130-*n* of a cell. For example and without limitation, the width parameters $\varepsilon_n = \varepsilon$ may be equal to 1, with $\Sigma_n \varepsilon_n = \Sigma\varepsilon = N$, as shown in FIGS. 3, 4 and 6, while the maximum width values $$w_n^{max}$$

of a slot 130-*n* are defined according to the following equation (04):

$$w_n^{max} = w^{max} = \frac{P}{N} \tag{04}$$

As a variant, the width parameters may be less than 1, with $\Sigma\varepsilon < N$, as shown in FIG. 5, where $\Sigma\varepsilon = N/2$, while the maximum width values of a slot 133-*n* are equal to $$w^{max} = P/4.$$

In the embodiments in which the cross section is a regular polygon, a slot 133-*n* may be positioned on one of the facets of the polyhedron of width $$l_c = \frac{P}{N}.$$

The maximum width value $$w_n^{max}$$

of a slot may be defined for example according to the following equation (05):

$$w_n^{max} \leq l_c \tag{05}$$

In some embodiments in which the cross section is a regular polygon, a slot 133-*n* may be positioned such that it coincides with an edge of the polyhedron.

The number N of slots 133-*n* may be equal to the number $N_c$ of sides, as shown in FIGS. 3, 4 and 6.

As a variant, the number N of slots 133-*n* may be less than the number $N_c$ of sides, as shown in FIG. 5. In particular, in the embodiments in which the cross section is a square and in which the electromagnetic wave of the RF signal circulating in the waveguide 130 comprises a given linear polarization defined along an axis X' defined in the plane (X,Y), the number N of slots 133-*n* may be equal to 2 and each slot 133-*n* may be positioned on a facet of the polyhedron parallel to the polarization axis X' (that is to say the slots then being arranged parallel to the electric field of the electromagnetic wave of the RF signal circulating in the waveguide 130).

As a variant, the number N of slots 133-*n* may be greater than the number $N_c$ of sides (not shown in the figures). For example and without limitation, a facet of the polyhedron may comprise at least two slots 133-*n*. In particular, in these embodiments, the slots 133-*n* positioned on one and the same facet of the support frame 130 may be symmetrical about an axis Z defined at the centre of this facet.

Advantageously, in the embodiments in which the thickness of the device $d_{z(n)}$ is variable in the plane (X,Y), the dimensions associated with the longitudinal slots 133-*n* (in particular, various slot lengths $d_n$ of one and the same support frame 130) are adapted so as to compensate for this variability in thickness $d_{z(n)}$, making it possible to adjust the slots 133-*n* to the variability of the wall lengths between adjacent cells.

Moreover, the support frame 130 may be entirely or partially metallic so as to form an electrically conductive structure. The notched opening of the support frames 132 at the N slots 133-*n* makes it possible to simulate a partially dielectric material and to significantly widen the transmission band of the device 10 for controlling RF beams.

The support frame 130 of a cell 100 is furthermore characterized by an impedance. In particular, the dimensions associated with the longitudinal slots 133-*n* make it possible to adjust the characteristic impedance of the cell 100. The variability of the width $w_n$ of the longitudinal slots 133-*n*, and in particular a variability function defined by an increasing or exponential function, makes it possible to progressively modify the impedance of the second, slotted frame part, starting from an input impedance of the waveguide (depending on the impedance of a first, slot-free frame part, typically around one hundred ohms) until matching the free-space impedance (that is to say 377Ω). This progressive modification of the impedance of the support frame 130 (and therefore of the device 10) makes it possible in particular to stabilize the active impedance of the radiating elements of the device 10 in an antenna system, regardless of the aim-off angle of the incident beam.

Therefore, a support frame 130, which is metallic and notched by the N longitudinal slots 133-*n* (or slotted), acts as a waveguide allowing the propagation of electromagnetic waves in TEM mode to be transmitted by the device 10 for controlling RF beams. Such support frames 130 may thus operate as radiating elements in all frequency bands of RF signals, and may in particular be used for L, S, C, Ku, Ka and Q/V bands. Indeed, the longitudinal slots allow the electric fields not to cancel one another out completely on the sides of the waveguide, thereby allowing the electromagnetic waves in TEM mode to settle.

The set of cells 100 forms a periodic arrangement of waveguides (or an array of cells 100) whose size is small compared to the wavelength λ associated with the frequency band of the RF beam that is emitted or received (SRF10 and SRF20). The electric field excited in a waveguide then couples with the neighbouring waveguides, generating significant coupling between cells, thereby allowing propagation of the electromagnetic waves in mode over a wide frequency band, and making it possible to ensure strong mutual coupling between adjacent waveguides. Such a set of cells 100 forms a wideband transmission window, making it possible not to introduce frequency dispersion into the sections of the waveguide.

The various cells 100 of the device 10 are adjacent and connected to one another, along the frame axis Z, by common cell parts. For example and without limitation, for a polygonal cell cross section, the various cells 100 may be connected by the prismatic faces.

The periodic arrangement of cells may be characterized by a lattice size of the array denoted ϕ, defined based on the shape and dimensions associated with the cross sections of the cells 100.

In an embodiment in which the cross section of the cells 100 is of circular shape, the lattice size ϕ corresponds to the diameter of the circular section. In an embodiment in which the cross section of the cells 100 is of polygonal shape, the lattice of the array ϕ corresponds for example to the diameter of the circle circumscribed within the polygonal section or to the side width $l_c$ of the polygon.

Advantageously, the lattice of the array ϕ of the device 10 may be uniform or variable in the plane (X,Y) depending on the modes of application of the invention. In particular, the lattice of the array ϕ may be determined with respect to a maximum lattice value denoted $\phi_{max}$. The maximum lattice value $\phi_{max}$ may be defined on the basis of the wavelength λ of the emitted or received RF beam (SRF10 and SRF20), the maximum aim-off angular sector $\pm\theta_{max}$ and the angular vision sector $\pm\theta_1$. The maximum lattice value $\phi_{max}$ may be defined for example according to the following expression (06):

$$\phi_{max} = \frac{\lambda}{\sin(|\theta_{max}|) + \sin(|\theta_1|)} \quad (06)$$

For example, the lattice of the array ϕ may be less than the maximum lattice value $\phi_{max}$, such that $\phi<\phi_{max}$. In this embodiment, the lattice of the array ϕ makes it possible not to bring about the appearance of grating lobes generated by a periodicity effect associated with the lattice. In addition, the lattice of the array ϕ may be determined so as to minimize the number of radiating elements in the device 10 for controlling RF beams. Advantageously, the lattice of the array ϕ may be between 0.4λ and 0.6λ. In particular, in the embodiments in which the beams SRF10 and/or SRF20 are what are referred to as dual-band signals, that is to say comprising two distinct RF frequency bands, the lattice of the array ϕ may be equal to 0.4.

Furthermore, the thickness of common walls between two cells 100 may be defined as being equal to a value 2×m. The thickness m of the support frame 132 may be small and may also be adjusted, for example minimized, so as to attenuate transmission losses of the beams SRF10 and/or SRF20 at the interfaces between air and the waveguide (for example at the frame entrance 131 and/or at the frame exit 132). It should be noted that the transmission losses over a given frequency band and a given angular sector are proportional to the ratio m/ϕ. The reduction in the bandwidth and the reduction in the angular sector associated with the RF wave may be correlated with the amount of metal material forming the support frame 130. Minimizing the wall thickness m may additionally lead to minimizing the total weight of the device 10, while still guaranteeing its rigidity. Advantageously, the wall thickness m is less than the wavelength λ, thereby making it possible to confer transmission stability on the RF wave with respect to the variation in the aperture angle of incidence (notably reception aperture angle of incidence $\theta_r$) on the device 10. In particular, the wall thickness m according to the modes of the invention may be between 250 μm and 500 μm. The wall thickness m may furthermore be defined on the basis of the advantages and constraints associated with the process for manufacturing the device 10. For example and without limitation, when the device is manufactured using an additive manufacturing process (or 3D printing technique), the wall thickness between two cells 100 of a device 300 for controlling RF beams may be equal to a value 2×m=500 μm. When the device is manufactured using what is referred to as a traditional manufacturing process, the wall thickness between two cells 100 may be equal to a value 2×m=1 mm.

In some embodiments, the frame entrance 131 may be "closed off" (or "sealed") in the plane (X,Y) by a closing wall 11-0 (not shown in FIG. 3 but illustrated in FIG. 6). Advantageously, the thickness of this closing wall 11-0 may be equal to the wall thickness m. In particular, each support frame 130 may comprise a frame entrance 131 that is closed off along the entrance face 11 of the device 10. A device 10 comprising closing walls 11-0 closing off the frame entrance 131 of the cells has advantages in terms of manufacture and structural strength. This closing wall 11-0 may be metallic.

In the embodiments in which the cross section of the cells 100 of the device 10 is polygonal, the various cells 100 being adjacent and connected to one another by the prismatic faces, the assembly of the closing walls 11-0 closing off the frame entrance 131 of the cells may form a single entrance plate. This entrance plate corresponds to a ground plane of the device 10.

For a device 10 comprising cells 100 with a polygonal cross section comprising a number of sides $N_c \leq 4$, the device 10 may have manufacturing advantages since the overall structure has less material. As an alternative, for a device 10 comprising cells 100 with a circular or polygonal cross section defined according to $N_c > 4$, the device 10 may have better impedance properties (active input part) of the radiating elements with respect to the variation in the aperture angle (that is to say angular orientation) of the beams SRF10 and/or SRF20 at the interfaces between air and the waveguide.

Each cell 100 of the device 10 for controlling RF beams comprises an internal excitation element 150 for exciting the cell 100 as shown in FIGS. 4, 5 and 6. Implementing an excitation element 150 internal to the support frame 130 makes it possible to preserve the intrinsic wideband properties of the waveguide. In particular, implementing an internal excitation element 150 in the support frame 130 makes it possible to progressively convert the fundamental mode of the RF signal circulating in the waveguide to the TEM mode of the RF signal propagating in the slotted sections.

According to some embodiments, an excitation element 150 may comprise a number H of longitudinal metal structures 152-*h* extending along the axis of the frame Z and arranged inside the cell 100. "h" is an index associated with the various slots, with h ε [1, H]. Each metal structure 152-*h*, also called a "ridge", is connected to the support frame 130 by a defined ridge edge h0, along the axis of the frame Z, extending from the frame entrance 131 (that is to say entrance position $Z_0$) to a ridge position denoted $Z_h$. As shown in the perspective view of a cell in FIG. 4, the ridge position $Z_h$ is arranged between the frame entrance 131 (that is to say entrance position $Z_0$) and the frame exit 132 (that is to say exit position $Z_c$). Each ridge 152-*h* thus has a ridge length $d_h$ along the axis of the frame Z, such that $d_h = Z_h - Z_0$ and that $d_h < d_z$ (or $d_h < d_{z(n)}$).

The distribution of the set of ridges inside the support frame 130 may be determined on the basis of the perimeter P of the cross section of the cell 100 and the number H of ridges 152-*h*.

In the embodiment in which the cross section of the cell 100 is a polygonal cross section, a ridge 152-*h* may be arranged inside the frame at an edge of the polyhedron forming the cell and oriented along the axis of the frame Z. The number H of ridges in a cell may furthermore be defined on the basis of the number N of slots 133-*n* and/or the number $N_c$ of sides of the polygonal cross section of a cell 100. For example and without limitation, the number H of ridges 152-*h* may be equal to the number N of slots 133-*n*. All of the ridges may be distributed regularly around the waveguide with a regular spacing between the ridges, for example equal to the ratio of the perimeter P to the number H. As shown in the example of FIG. 4, each ridge 152-*h* may be positioned at each edge of the polyhedron forming the cell (such that $$\frac{P}{H} = l_c \Big),$$

while each slot 133-*n* may be positioned on one side of the cell 100. In one variant, each ridge 152-*h* may be positioned on an inner lateral surface of the cell 100.

In particular, in the embodiments in which the electromagnetic wave of the RF signal circulating in the waveguide 130 comprises a given linear polarization defined along an axis X' defined in the plane (X,Y), each ridge 152-*h* may be positioned in a plane orthogonal to the slots 133-*n* of the cell 100, the slots then being arranged parallel to the electric field of the electromagnetic wave of the RF signal circulating in the waveguide 130.

In some embodiments, the ridge position $Z_h$ along the axis of the frame Z may be arranged between the frame entrance 131 (that is to say entrance position $Z_0$) and a slot position $Z_{0n}$, such that the ridge 152-*h* is located in a first part of length $d_{0n}$ corresponding to the slot-free support frame 130, with $d_h \leq d_{0n}$. As an alternative, the ridge position $Z_h$ may be arranged between the frame exit 132 (that is to say exit position $Z_c$) and a position $Z_{0n}$ of a slot 133-*n*, such that $d_h > d_{0n}$. In this case, part of the ridge 152-*h* and part of the slot 133-*n* may overlap (or be "superimposed") at least partially over an overlap distance of between $Z_h$ and $Z_{0n}$. A cell 100 comprising a superposition between ridges and slots makes it possible to ensure progressive conversion from the fundamental mode of the RF signal circulating in the waveguide (ridged guide in this case) to the TEM mode of the RF signal propagating in the slotted sections (slotted guide). Such superposition between ridges and slots also makes it possible to obtain a compact cell 100 design.

Furthermore, each ridge 152-*h* has a thickness $m_h$ and a width $l_h$. The ridge thickness $m_h$ and/or the ridge width $l_h$ are variable dimensions along the axis Z, such that each ridge 152-*h* comprises a plurality of "steps" distributed along the axis of the frame Z.

In some embodiments, the ridge thickness $m_h$ and/or the ridge width $l_h$ assumes a maximum value ( $$w_h^{max}$$

and $l_h^{max}$, respectively) at the frame entrance 131 (that is to say entrance position $Z_0$), and a minimum value ( $(m_h^{min}$ and $l_h^{min}$, respectively) at the ridge position $Z_h$. The number of steps and their dimensions may be determined on the basis of the ridge length $d_h$ and maximum and minimum ridge values $(m_h^{max}, l_h^{max}, m_h^{min}$ and $l_h^{min})$, according to a ridge variability profile denoted $f_h$. Advantageously, the minimum value of the ridge thickness $m_h^{min}$ and/or of the ridge width $l_h^{min}$ may be equal to the wall thickness m.

The various dimensions of the ridge 152-*h* are configured to contribute to the mode conversion in the waveguide of the cell 100. In general, the thicknesses and the heights of the steps of the ridges 152-*h* may vary notably in a decreasing manner along the axis Z, from the entrance position $Z_0$ to the ridge position $Z_h$.

Advantageously, the dimensions of the ridges of one and the same cell 100 and/or of the slots of the set of cells 100 of the device 10 for controlling RF beams may be identical or different from one another depending on the modes of application of the invention.

In the absence of these ridge elements 152-*h*, and with a small lattice of the array ϕ (between 0.4λ and 0.6λ), it is no longer possible to propagate a mode over a wide RF band in order to excite the radiating element.

In some embodiments, a support frame 130 associated with ridges 152-*h* may comprise a polarizer (or what is referred to as a 'septum' polarizer, not shown in the figures) for generating radiation with dual circular polarization. As used here, a "polarizer" refers to an element intended to convert received signals SRF20 having a circular polarization into signals SRF22 having a linear polarization, on the one hand, and signals SRF12 to be emitted having a linear polarization into signals SRF10 having a circular polarization, on the other hand. The polarizer may be formed by an internal plate extending along the axis of the frame Z and generated from two ridges 152-*h* that are connected at least partially to one another inside the cell 100. For example, the two ridges 152-*h* that are connected to form the polarizer may originate from opposing edges of the polygonal right cylinder or on two opposing inner side surfaces of the polygonal right cylinder.

Figure 7A:
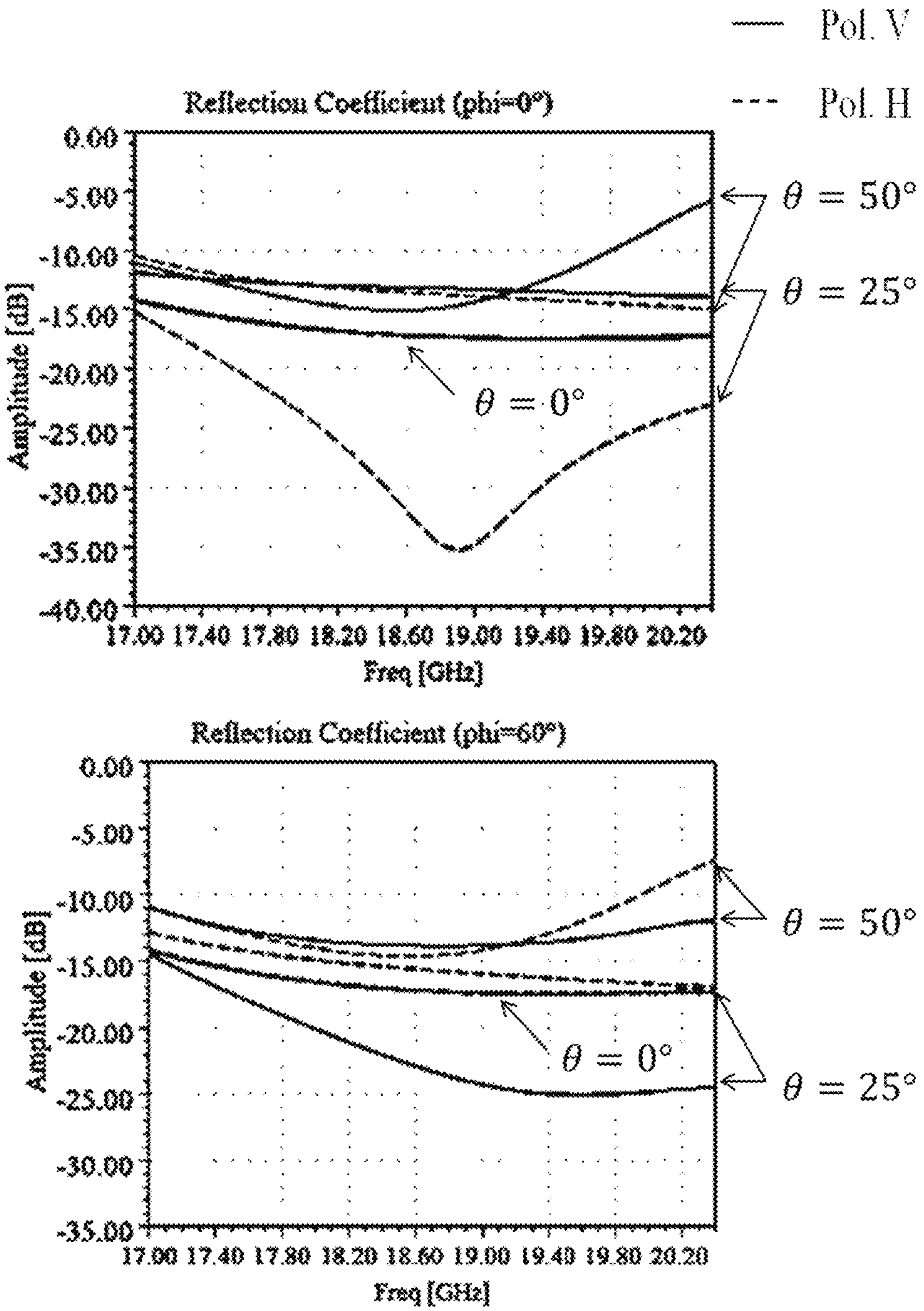
FIGS. 7*a* and 7*b* are sets of graphs illustrating the radio performance achieved by a device for controlling radiofrequency beams according to some exemplary embodiments of the invention.
Figure 7B:
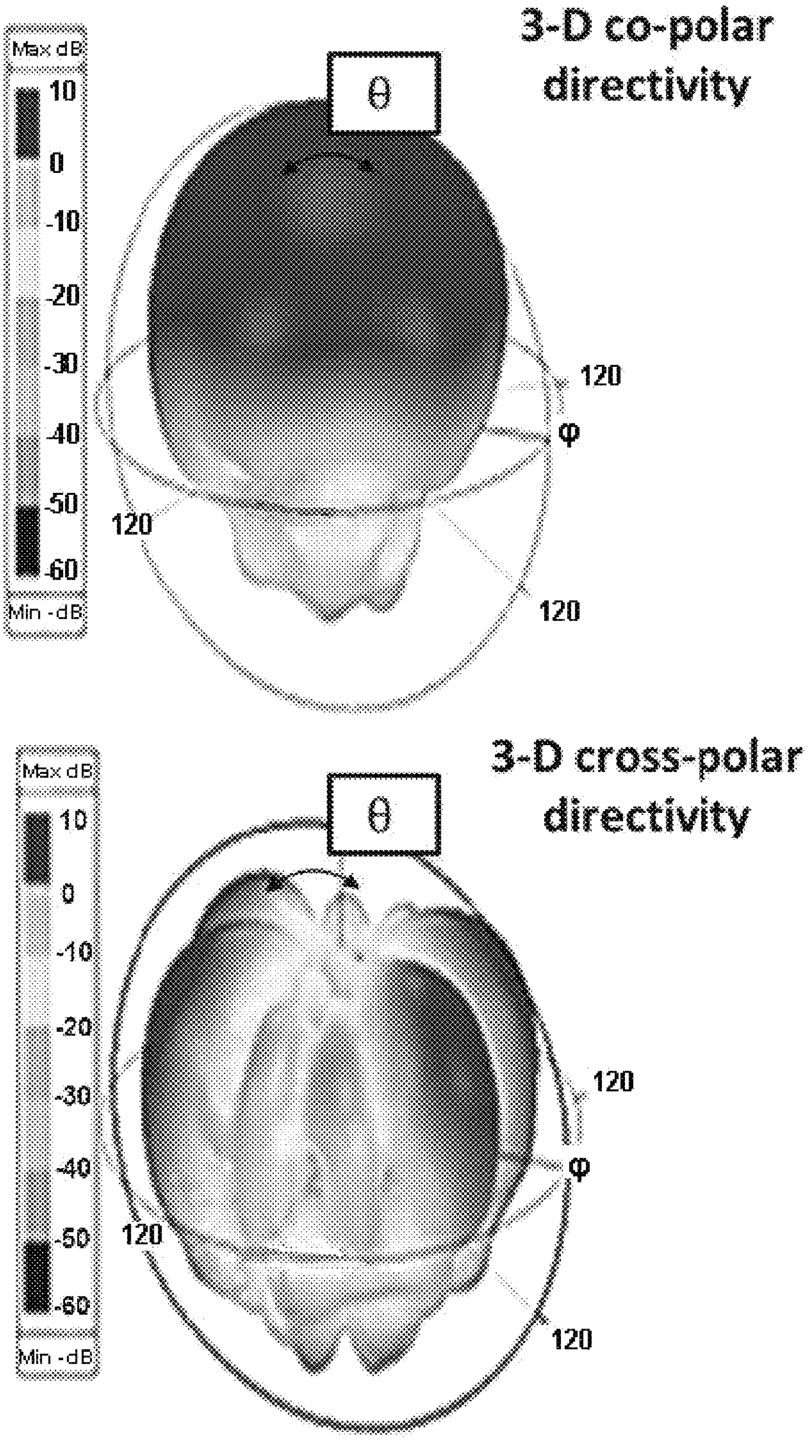

FIGS. 7(*a*), 7(*b*) and 8 are graphs illustrating examples of radio performance achieved by a device 10 comprising an excitation element 150.

In particular, the graphs in FIG. 7(*a*) show the evolution of the simulated active reflection coefficient as a function of frequency for a device 10 of which each cell 100 comprises ridges 152-*h*, according to some embodiments of the invention. The determination based on simulation of the active reflection coefficient makes it possible notably to characterize the variation in the active impedance of the device 10, taking into account a radiating element surrounded by an infinite number of similar radiating elements (that is to say infinite array) associated with a phase gradient of an electromagnetic wave. The phase gradient makes it possible to orient the resulting beam at emission from the device 10 at a given angle of incidence θ. The graphs in FIG. 7(*a*) highlight stabilization of the active impedance over a large angular sector. Indeed, the active reflection coefficient shown in FIG. 7(*a*) is less than −10 dB for a wide Ka and X frequency band of the electromagnetic wave regardless of the direction of propagation of the emission beam (that is to say according to the spherical coordinates θ, with phi=0° and phi=60°).

The graphs in FIG. 7(*b*) show the evolution of the simulated gain of an electromagnetic wave in a continuity of given emission directions θ (or phi) of the resulting beam at emission, with co-polarization and cross-polarization of the RF source, for a device 10 of which each cell 100 comprises ridges 152-*h*, according to some embodiments of the invention. The determination based on simulation of such a radiation pattern over a given angular sector may be correlated with the variation in the active impedance over this angular sector of a radiating element fed by an electromagnetic wave and positioned at the centre of a small array (for example at the centre of 24 other similar radiating elements connected to a load), thus taking into account the mutual coupling between the radiating elements as well as the edge effects associated with this small array. The graphs in FIG. 7(*b*) highlight stabilization of the radiation pattern in all emission planes of the device 10, as well as a small decrease in cross-polarization gain ranging from 3 to 5 dB. Indeed, the variation in the main-polarization gain in this "surrounded" radiation pattern, as it is referred to (that is to say graphs in FIG. 7(*b*)), is related to the variation in the active impedance as a function of the direction of the beam. Thus, the more stable the gain over a set of directions of incidence of the beam, the lower the degradation of the active impedance when a beam is pointed in these directions.

The transmission mode of the microwaves in the amplifiers and in the radiating panel 10 are different. Indeed, the waves at the output of the radiating panel are transmitted via a (ridged) waveguide, whereas the waves in the amplifier generally propagate by way of what is referred to as a "microstrip line", which may be any type of suitable microwave transmission line. The change from the waveguide microwave propagation mode from the radiating panel to the microstrip line of the amplifiers is carried out via a matched transition.

According to some embodiments, an excitation element 150 may comprise what is referred to as a "Vivaldi" antipodal transition 154 arranged inside the cell 100, making it possible to achieve a transition between a waveguide and a microstrip line.

As shown in the perspective view of a cell in FIG. 5, an antipodal transition 154 comprises a first metal structure 154-1 extending in a first plane (X',Z), and a second metal structure 154-2 extending in a second plane (X',Z) parallel to the first plane (X',Z).

According to some embodiments, the antipodal transition 154 may be a "three-plane structure" (or "three-plate line") such that the antipodal transition 154 comprises a third metal structure 154-3 extending in a third plane (X',Z) parallel to the first and second planes (X',Z). In particular, the first metal structure 154-1 may be arranged between the second metal structure 154-2 and the third metal structure 154-3. In this case, the third metal structure 154-3 has a shape equivalent to the second metal structure 154-2.

In some embodiments, an antipodal transition 154 may furthermore comprise a dielectric substrate 154-0 comprising at least a first dielectric face and a second dielectric face, the second dielectric face being opposite and parallel to the first dielectric face, the first and second dielectric faces extending along the axis of the frame Z. In these embodiments, the first metal structure 154-1 corresponds to a first metal etching 154-1 arranged on the first dielectric face, and the second metal structure 154-2 corresponds to a second metal etching 154-2 arranged on the second dielectric face. In the embodiments in which the antipodal transition 154 is a "three-plane structure", the dielectric substrate 154-0 may comprise a third dielectric face extending along the axis of the frame Z and parallel to the first and second dielectric faces. In particular, the first dielectric face may be arranged between the second and the third face of the dielectric substrate 154-0. In this case, the third metal structure 154-3 corresponds to a third metal etching 154-3 arranged on the third dielectric face and having a shape equivalent to the second metal etching 154-2.

In some embodiments, the dielectric substrate 154-0 may be positioned inside the support frame 130 and connected by one or two opposing edges or else by two opposing inner side surfaces of the support frame 130, by a substrate edge, and/or a first and a second substrate edge denoted g0-1 or g0-2, of substrate length $d_g$ and defined along the axis of the frame Z, from the frame entrance 131 (that is to say entrance position $Z_0$) to a substrate position denoted $Z_g$, such that $d_g=Z_g-Z_0$ and that $d_g<d_z$ (or $d_g<d_{z(n)}$).

In some embodiments, the substrate position $Z_g$ along the axis of the frame Z may be arranged between the frame entrance 131 and a slot position $Z_{0n}$, such that the dielectric substrate 154-0 is located in a first part of length $d_{0n}$ corresponding to the slot-free support frame 130, with $d_g \leq d_{0n}$. As an alternative, the substrate position $Z_g$ may be arranged between the frame exit 132 (that is to say exit position $Z_c$) and a position $Z_{0n}$ of a slot 133-*n*, such that $d_g>d_{0n}$. In this case, part of the dielectric substrate 154-0 and part of the slot 133-*n* may overlap (or be "superimposed") over an overlap distance of between $Z_g$ and $Z_{0n}$.

Furthermore, the first metal structure (or etching) 154-1 may form a conductive microstrip arranged at the frame entrance 131 (that is to say entrance position $Z_0$). The first metal structure (or etching) 154-1 is progressively widened in the first plane (X',Z), inside the waveguide up to a first etching position $Z_{0g}$ so as to be connected to a first substrate edge g0-1. The second metal structure (or etching) 154-2 (and possibly the third metal structure or etching 154-3) may form a ground plane starting from a position $Z_m$ lower than the entrance position $Z_0$ of the frame entrance 131 up to a second etching position $Z_{mg}$. The second metal structure (or etching) 154-2 (and possibly the third metal structure or etching 154-3) may also form a conductive microstrip that widens progressively in the second plane (X',Z), inside the waveguide from the second etching position $Z_{mg}$ up to the first etching position $Z_g$ so as to be connected to the second substrate edge g0-2. It should be noted that the electric field is then established between the first metal structure (or etching) 154-1 and the second metal structure (or etching) 154-2 (and possibly between the first metal structure or etching 154-1 and the third metal structure or etching 154-3) along the polarization axis X' shown in FIG. 5.

Advantageously, the first etching position $Z_{0g}$, along the axis of the frame Z, is arranged between the frame entrance 131 and the substrate position $Z_g$, and the second etching position $Z_{mg}$, along the axis of the frame Z, is arranged between the frame entrance 131 and the first etching position $Z_{0g}$.

In the embodiments in which the substrate position $Z_g$ is arranged between the frame exit 132 and a position $Z_{0n}$ of a slot 133-*n*, the first etching position $Z_{0g}$ along the axis of the frame Z may be arranged between the substrate position $Z_g$ and the position $Z_{0n}$ of the slot 133-*n*. In this case, some of the first and second metal etchings and part of the slot 133-*n* may overlap (or be "superimposed") at least partially over an overlap distance of between $Z_g$ and $Z_{0n}$.

In some embodiments, the metal structures (or etchings) 154-1, 154-2 (and optionally 154-3) may be characterized by a thickness $m_s$ defined in a plane perpendicular to the planes (X',Z). In particular, the thickness $m_s$ of each metal structure (or etching) may be equal to the wall thickness m.

Advantageously, the shape of each metal etching of the antipodal transition 154 is configured to "rotate" the electric field.

According to some embodiments, an excitation element 150 may comprise a number T of planar metal elements 156-*t* extending in the plane (X,Y) and arranged above one another along the axis of the frame Z. "t" is an index associated with the various slots, with t ε [1, T]. Advantageously, in such embodiments, the excitation element 150 furthermore comprises a closing wall 11-0 arranged at the frame entrance 131 of the cell (and by extension at the entrance face 11 of the device 10).

In particular, each planar element 156-*t* (also called planar radiating element or 'patch') may be of any shape. For example and without limitation, a planar element 156-*t* may be of circular shape or of polygonal shape comprising a number $N_c$ of sides. A planar element 156-*t* may furthermore be centred inside the support frame 130. Each planar element 156-*t* may be arranged at a planar position $Z_t$ defined between the frame entrance 131 (that is to say entrance position $Z_0$) and the frame exit 132 (that is to say exit position $Z_c$), as shown in FIG. 6.

In some embodiments, a planar position $Z_t$ defined along the axis of the frame Z may be located between the frame entrance 131 (that is to say entrance position $Z_0$) and a slot position $Z_{0n}$, such that a planar element 156-*t* is located in a first part of length $d_{0n}$ corresponding to the slot-free support frame 130, with $d_h \leq d_{0n}$. As an alternative, a planar position $Z_t$ may be located between the frame exit 132 (that is to say exit position $Z_c$) and a position $Z_{0n}$ of a slot 133-*n*, such that $d_h>d_{0n}$. In this case, the planar element 156-*t* may be located above the position $Z_{0n}$ of the slot 133-*n* at the position $Z_t$. A cell 100 comprising at least one planar element 156-*t* located above the base of the set of slots (that is to say position $Z_{0n}$) makes it possible to obtain a compact cell design.

Furthermore, each planar element **156-*t* may be separated by a spacing δz between the closing wall 11-0 and/or one of the other planar elements 156-*t*. Each planar element 156-*t*** may be characterized by a thickness $m_t$ and a width D*t*. In particular, the thickness $m_t$ of each planar element **156-*t*** may be equal to the wall thickness m.

Advantageously, the planar elements **156-*t* may be connected to one another and/or to the closing wall 11-0 by one or more substrates 156-0, extending along the axis of the frame Z inside the support frame 130. For example and without limitation, a substrate 156-0 of a planar element 156-*t* may be metallic so as to form an entirely metal cell 100. As an alternative, a substrate 156-0 of a planar element 156-*t*** may be dielectric.

Figure 8:
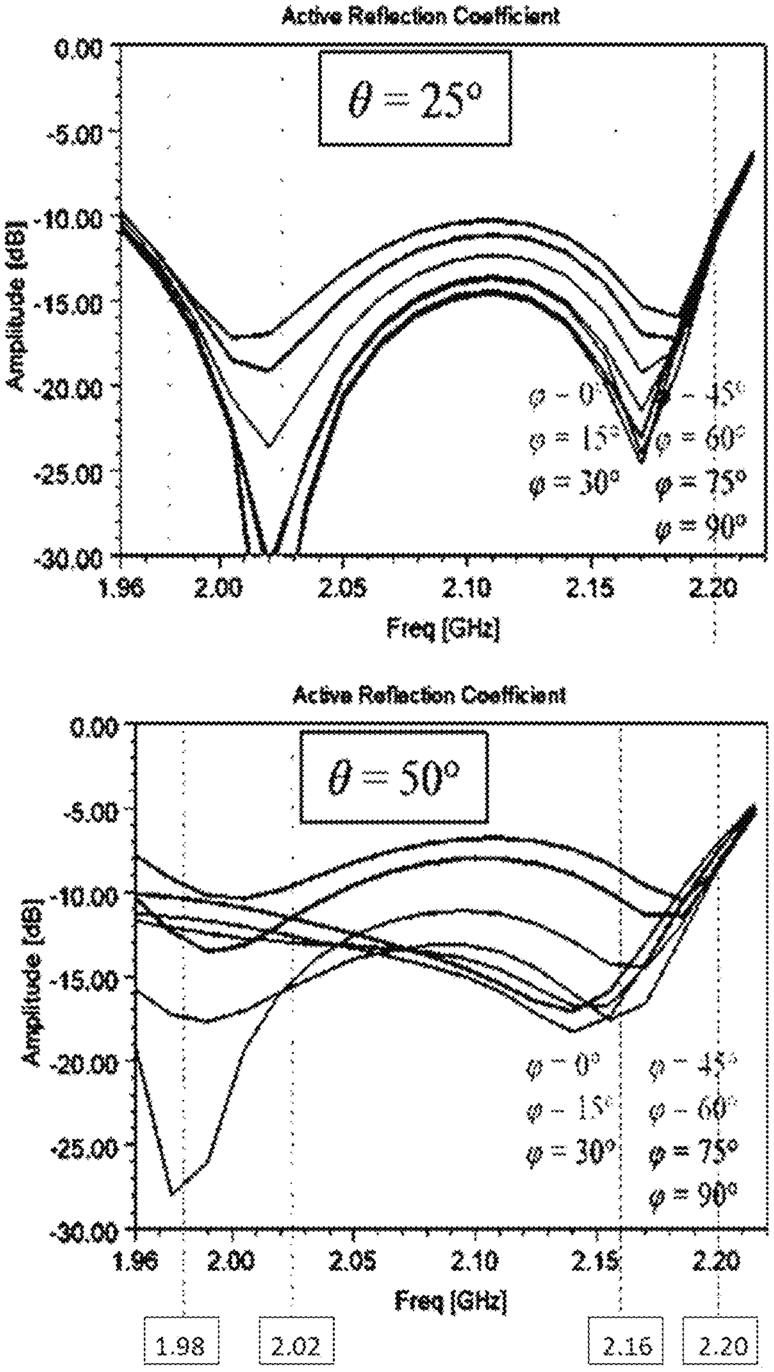
FIG. 8 is a set of graphs illustrating the radio performance achieved by a device for controlling radiofrequency beams, according to some exemplary embodiments of the invention.

The electromagnetic coupling between multiple patches of different dimensions produces additional resonances that make it possible to increase bandwidth, as illustrated in the graphs in FIG. 8 showing the evolution of the simulated active reflection coefficient as a function of frequency, for a device 10 of which the cells 100 comprise planar elements **156-*t*** according to some embodiments of the invention, as a function of various beam directions of emission (that is to say θ=25° and θ=50°).

In some embodiments, a planar element **156-*t* may comprise a number $T_x$ of cavities 156-*tx* that makes it possible notably to modify the resonant frequency of the cell 100. The arrangement of cavities 156-*tx* on the planar element 156-*t* of the cell 100 also makes it possible to reduce the weight of the planar element 156-*t***.

The various dimensions of the planar elements of one and the same cell 100 and/or of the planar elements of the set of cells 100 of the device 10 for controlling RF beams may be identical or different from one another depending on the applications of the invention. For example and without limitation, the width $D_t$ of the planar elements may be progressively reduced between the width of a planar element at the exit of the cell 100 compared to the width of a planar element at the entrance of the cell 100. This reduction in width $D_t$ of planar elements makes it possible to contribute to the progressive matching of the impedance of the cell with the free-space impedance.

The embodiments in which the excitation element 150 comprises planar metal elements are particularly suitable for use for radiating elements in L or S low-frequency bands. Furthermore, these embodiments allow for the design of a compact device, with a reduced vertical size, notably along the axis Z, and with low weight that is beneficial for antenna applications on a satellite.

The device 10 for controlling RF beams may be manufactured using various techniques. One manufacturing technique may be a 3D printing technique, also called additive manufacturing. Some 3D printing techniques make it possible to obtain a uniform device 10, not comprising any dielectric and entirely metallic, using an electrically conductive material such as aluminium or titanium for example. The electrically conductive material such as titanium may then be coated with another electrically conductive material such as silver for example in order to reduce ohmic losses. These 3D printing techniques are particularly suitable for use of the device 10 in Ku, Ka and Q/V bands. A technique for manufacturing patches relating to the use of the device 10 in L or S low-frequency bands may be implemented through conventional manufacturing and assembly of all-metal parts, or through additive manufacturing of the support frame combined with assembly of patches obtained using printed technology.

It should be noted that, unless indicated otherwise or technically impossible, the various embodiments, variants and alternative embodiments of the invention may be combined. The device for controlling RF beams in particular may thus comprise one or more of the features listed above taken in isolation or in any possible technical combination.

Furthermore, the present invention is not limited to the embodiments described above by way of non-limiting example. It encompasses all variant embodiments that might be envisaged by a person skilled in the art. In particular, a person skilled in the art will understand that the invention is not limited to the cell geometries and frame geometries corresponding to the radiating element and the excitation element geometries described by way of non-limiting example.

The invention claimed is:

1. A device for controlling radiofrequency beams that is defined in an orthogonal reference frame (X,Y,Z), the device generally extending in the plane (X,Y) of said orthogonal reference frame (X,Y,Z), the device comprising an array of cells, each cell corresponding to a radiating element, said cell comprising a support frame and an excitation element for exciting said radiating element, each radiofrequency beam being defined according to a given direction of propagation having an angle of incidence θ with respect to said device, wherein said support frame is inscribed within a generally tubular shape oriented along the axis Z of said orthogonal reference frame (X,Y,Z), said tubular shape having a given length $d_z$ along the axis of the frame Z and a cross section defined in the plane (X,Y), said cross section having a perimeter P, said support frame comprising a frame entrance and a frame exit, said support frame furthermore comprising a number N of slots extending, along the axis of the frame Z, between said frame exit and a slot position $Z_{0n}$ along the axis of the frame Z, said slot position $Z_{0n}$ being located between said frame entrance and said frame exit, each slot having a variable slot width $$w_n$$

along the axis of the frame Z, said slot width $$w_n$$

having a minimum slot value $$w_n^{min}$$

at said slot position $Z_{0n}$, and a maximum slot value $$w_n^{max}$$

at the frame exit, the maximum slot value $$w_n^{max}$$

being determined on the basis of the perimeter P of the cross section and the number N of slots, the excitation element comprising a number H of longitudinal metal ridges arranged inside said tubular shape, a ridge extending along the axis of the frame Z between said frame entrance and a ridge position $Z_h$, said ridge position $Z_h$, being defined between said frame entrance and said frame exit, the number H of ridges being equal to the number N of slots, each cell being configured to emit and/or receive radiofrequency beams in an invariant manner according to said direction of propagation.

2. The device for controlling radiofrequency beams according to claim 1, wherein each slot is associated with at least two slot edges (n1 and n2), the slot edges representing the limits of the support frame connecting said slot position $Z_{0n}$ to said frame exit, each slot edge (n1, n2) being associated with a variability function ($f_{n1}$ $f_{n2}$), said variability function being a concave and/or convex polygonal function.

3. The device for controlling radiofrequency beams according to claim 1, wherein the ridges of the cell are identical to one another and the slots of the cell are identical to one another, said ridge position $Z_h$ being defined between said slot position $Z_{0n}$ and said frame exit.

4. The device for controlling radiofrequency beams according to claim 1, wherein the excitation element comprises what is referred to as a "Vivaldi" antipodal transition arranged at least partly inside said tubular shape, the transition comprising at least a first metal etching and a second metal etching extending along the axis of the frame Z between said frame entrance and an etching position $Z_{0g}$, said etching position $Z_{0g}$ being defined between said frame entrance and said frame exit.

5. The device for controlling radiofrequency beams according to claim 1, wherein the excitation element comprises a number T of planar metal elements arranged inside said tubular shape, a planar element extending along the plane (X,Y) at a planar position $Z_t$, said planar position $Z_t$ being defined between said frame entrance and said frame exit.

6. The device for controlling radiofrequency beams according to claim 5, wherein the slots of the cell are identical to one another, said planar position $Z_t$ being defined between said slot position $Z_{0n}$ and said frame exit.

7. The device for controlling radiofrequency beams according to claim 1, wherein the device is partly metallic, and wherein the cross section has a circular or polygonal shape.

8. A method for manufacturing the device for controlling radiofrequency beams according to claim 1, wherein the manufacturing method uses at least one 3D printing technique to manufacture said device.

9. A device for controlling radiofrequency beams that is defined in an orthogonal reference frame (X,Y,Z), the device generally extending in the plane (X,Y) of said orthogonal reference frame (X,Y,Z), the device comprising an array of cells, each cell corresponding to a radiating element, said cell comprising a support frame and an excitation element for exciting said radiating element, each radiofrequency beam being defined according to a given direction of propagation having an angle of incidence θ with respect to said device, wherein said support frame is inscribed within a generally tubular shape oriented along the axis Z of said orthogonal reference frame (X,Y,Z), said tubular shape having a given length $d_z$ along the axis of the frame Z and a cross section defined in the plane (X,Y), said cross section having a perimeter P, said support frame comprising a frame entrance and a frame exit, said support frame furthermore comprising a number N of slots extending, along the axis of the frame Z, between said frame exit and a slot position $Z_{0n}$ along the axis of the frame Z, said slot position $Z_{0n}$ being located between said frame entrance and said frame exit, each slot having a variable slot width $$w_n$$

along the axis of the frame Z, said slot width $$w_n$$

having a minimum slot value $$w_n^{min}$$

at said slot position $Z_{0n}$, and a maximum slot value $$w_n^{max}$$

at the frame exit, the maximum slot value $$w_n^{max}$$

being determined on the basis of the perimeter P of the cross section and the number N of slots, the excitation element comprising what is referred to as a "Vivaldi" antipodal transition arranged at least partly inside said tubular shape, the transition comprising at least a first metal etching and a second metal etching extending along the axis of the frame Z between said frame entrance and an etching position $Z_{0g}$, said etching position $Z_{0g}$ being defined between said frame entrance and said frame exit, each cell being configured to emit and/or receive radiofrequency beams in an invariant manner according to said direction of propagation.

10. The device for controlling radiofrequency beams according to claim 9, wherein each slot is associated with at least two slot edges (n1 and n2), the slot edges representing the limits of the support frame connecting said slot position $Z_{0n}$ to said frame exit, each slot edge (n1, n2) being associated with a variability function ($f_{n1}$ $f_{n2}$), said variability function being a concave and/or convex polygonal function.

11. The device for controlling radiofrequency beams according to claim 9, wherein the excitation element comprises a number H of longitudinal metal ridges arranged inside said tubular shape, a ridge extending along the axis of the frame Z between said frame entrance and a ridge position $Z_h$, said ridge position $Z_h$ being defined between said frame entrance and said frame exit, the ridges of the cell being identical to one another and the slots of the cell are identical to one another, said ridge position $Z_n$ being defined between said slot position $Z_{0n}$ and said frame exit.

12. The device for controlling radiofrequency beams according to claim 9, wherein the excitation element comprises a number T of planar metal elements arranged inside said tubular shape, a planar element extending along the plane (X, Y) at a planar position $Z_t$, said planar position $Z_t$ being defined between said frame entrance and said frame exit, and wherein the slots of the cell are identical to one another, said planar position $Z_t$ being defined between said slot position $Z_{0n}$ and said frame exit.

13. The device for controlling radiofrequency beams according to claim 9, wherein the device is partly metallic, and wherein the cross section has a circular or polygonal shape.

14. A method for manufacturing the device for controlling radiofrequency beams according to claim 11, wherein the manufacturing method uses at least one 3D printing technique to manufacture said device.

15. A device for controlling radiofrequency beams that is defined in an orthogonal reference frame (X,Y,Z), the device generally extending in the plane (X, Y) of said orthogonal reference frame (X,Y,Z), the device comprising an array of cells, each cell corresponding to a radiating element, said cell comprising a support frame and an excitation element for exciting said radiating element, each radiofrequency beam being defined according to a given direction of propagation having an angle of incidence θ with respect to said device, wherein said support frame is inscribed within a generally tubular shape oriented along the axis Z of said orthogonal reference frame (X, Y,Z), said tubular shape having a given length $d_z$ along the axis of the frame Z and a cross section defined in the plane (X,Y), said cross section having a perimeter P, said support frame comprising a frame entrance and a frame exit, said support frame furthermore comprising a number N of slots extending, along the axis of the frame Z, between said frame exit and a slot position $Z_{0n}$ along the axis of the frame Z, said slot position $Z_{0n}$ being located between said frame entrance and said frame exit, each slot having a variable slot width $$w_n$$

along the axis of the frame Z, said slot width $$w_n$$

having a minimum slot value $$w_n^{min}$$

at said slot position $Z_{0n}$, and a maximum slot value $$w_n^{max}$$

at the frame exit, the maximum slot value $$w_n^{max}$$

being determined on the basis of the perimeter P of the cross section and the number N of slots, the excitation element comprising a number T of planar metal elements arranged inside said tubular shape, a planar element extending along the plane (X, Y) at a planar position $Z_t$, said planar position $Z_t$ being defined between said frame entrance and said frame exit, each cell being configured to emit and/or receive radiofrequency beams in an invariant manner according to said direction of propagation.

16. The device for controlling radiofrequency beams according to claim 15, wherein each slot is associated with at least two slot edges (n1 and n2), the slot edges representing the limits of the support frame connecting said slot position $Z_{0n}$ to said frame exit, each slot edge (n1, n2) being associated with a variability function ($f_{n1}$ $f_{n2}$), said variability function being a concave and/or convex polygonal function.

17. The device for controlling radiofrequency beams according to claim 15, wherein the slots of the cell are identical to one another, said planar position Z being defined between said slot position $Z_{0n}$ and said frame exit.

18. The device for controlling radiofrequency beams according to claim 15, wherein the excitation element comprises a number H of longitudinal metal ridges arranged inside said tubular shape, a ridge extending along the axis of the frame Z between said frame entrance and a ridge position $Z_h$, said ridge position $Z_h$ being defined between said frame entrance and said frame exit, the ridges of the cell being identical to one another and the slots of the cell are identical to one another, said ridge position $Z_h$ being defined between said slot position $Z_{0n}$ and said frame exit.

19. The device for controlling radiofrequency beams according to claim 15, wherein the device is partly metallic, and wherein the cross section has a circular or polygonal shape.

20. A method for manufacturing the device for controlling radiofrequency beams according to claim 17, wherein the manufacturing method uses at least one 3D printing technique to manufacture said device.

* * * * *